United States Patent
Dadiomov et al.

(10) Patent No.: US 8,510,721 B2
(45) Date of Patent: Aug. 13, 2013

(54) DYNAMIC CALCULATION OF SAMPLE PROFILE REPORTS

(75) Inventors: Alexander Dadiomov, Redmond, WA (US); Mayank Agarwal, Redmond, WA (US); Xinhua Ji, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 316 days.

(21) Appl. No.: 12/868,495

(22) Filed: Aug. 25, 2010

(65) Prior Publication Data
US 2012/0054721 A1 Mar. 1, 2012

(51) Int. Cl.
*G06F 9/44* (2006.01)
(52) U.S. Cl.
USPC ........... 717/128; 717/131; 717/133; 717/158; 719/315; 709/213
(58) Field of Classification Search
USPC ................. 717/128, 130, 133, 158; 719/331; 709/213
See application file for complete search history.

(56) References Cited

U.S. PATENT DOCUMENTS

| | | | | |
|---|---|---|---|---|
| 5,828,883 A | * | 10/1998 | Hall | 717/133 |
| 6,651,243 B1 | * | 11/2003 | Berry et al. | 717/130 |
| 6,769,126 B1 | * | 7/2004 | Pekowski | 719/331 |
| 7,386,686 B2 | | 6/2008 | Wu et al. | |
| 7,519,961 B2 | | 4/2009 | Alexander | |
| 2005/0223080 A1 | * | 10/2005 | Gray | 709/213 |
| 2006/0069682 A1 | | 3/2006 | Fanous | |
| 2007/0083856 A1 | | 4/2007 | Chilimbi et al. | |
| 2007/0245238 A1 | | 10/2007 | Fugitt | |
| 2009/0241095 A1 | | 9/2009 | Jones | |
| 2009/0276714 A1 | | 11/2009 | Kandlikar et al. | |
| 2010/0017791 A1 | * | 1/2010 | Finkler | 717/158 |
| 2010/0194766 A1 | | 8/2010 | Nakagawa | |

OTHER PUBLICATIONS

Mark Friedman, "Dynamic Performance Analysis: Rules and Guidance for Visual Studio Profiling Tools Users", Published Date: May 2010, (10 pages).
Byeongcheol Lee et al., "Correcting the Dynamic Call Graph Using Control-Flow Constraints", Retrieved Date: Jul. 28, 2010 (22 pages).
John Whaley, "A Portable Sampling-Based Profiler for Java Virtual Machines", Published Date: Jun. 2000 (10 pages).
Martin Hirzel & Trishul Chilimbi, "Bursty Tracing: A Framework for Low-Overhead Temporal Profiling", Retrieved Date: Jul. 28, 2010.
Marty Itzkowitz, "The Sun Studio Performance Tools", Published Date: Nov. 10, 2005, http://developers.sun.com/solaris/articles/perftools.html (15 pages).

(Continued)

*Primary Examiner* — Vanel Frenel
(74) *Attorney, Agent, or Firm* — Workman Nydegger (57) ABSTRACT

The construction or use of a hierarchical time tree that represents an execution time of a program. To construct the hierarchical time tree, the time frame corresponding to the root node is the execution time during which the plurality of call stack samples were gathered from the program. Beginning at the root node, and proceeding recursively, each node is then populated in a manner that all of the call stacks for a given time period need not be accessed in order to provide a report regarding the given time period.

20 Claims, 4 Drawing Sheets

(56) References Cited

OTHER PUBLICATIONS

Rivest, Sonia, "Toward Better Support for Spatial Decision Making: Defining the Characteristics of Spatial On-Line Analytical Processing (SOLAP)", Geomatica vol. 55. No. 4, 2001, pp. 539 to 555.
Yang, Li, "Multiresolution Data Aggregation and Analytical Exploration of Large Data Sets", Based on information and belief available, at least as early as Dec. 30, 2010, 5 pages.
Carmo, Maria Beatriz, et al., "Visualization of Large Volumes of Information Using Different Representations", Based on information and belief available, at least as early as Dec. 30, 2010, 5 pages.
Gao, Jinzhu, et al., "A Parallel Multiresolution Volume Rendering Algorithm for Large Data Visualization", Dec. 9, 2004, 21 pages.
Rhodes, Philip J., et al., "Iteration Aware Prefetching for Large Multidimensional Scientific Datasets", Based on information and belief available, at least as early as Dec. 30, 2010, 10 pages.

* cited by examiner

DYNAMIC CALCULATION OF SAMPLE PROFILE REPORTS

BACKGROUND

Software profiling involves recording what a software program is doing, and presenting the results to a user so that the user understands how much execution time is spent in the various parts of the program. One mechanism for profiling is called "sampling" in which the call stack of a program is sampled at periodic intervals throughout the execution of the program. The call stack identifies the current function that the program is in, as well as the chain of functional calls (leading from the main program) that lead to the current function being called, with each level in the call stack representing a function call. Sometimes, call stacks can be dozens or even hundreds of levels deep. If, for example, a call stack is sampled every millisecond, and execution time is 300 seconds, there would be 300,000 samples of call stacks, each call stack being potentially quite large. Thus, the recorded data for the sampling may be quite voluminous, involving a linear sequence of each sampled call stack. In multi-threaded applications, this sampling occurs for each thread.

In order to present the recorded data to a user for a particular time period, the presentation program accesses each sampled call stack one-by-one for the call stacks that correspond to that time period. As the presentation program does this, it responsively creates a call stack tree, each node in the tree representing a function of the program, and with the root node representing the main program. When a unique call stack is encountered, the tree is augmented by adding a node representing the function to the tree with an appropriate ancestral chain in the tree such that as one proceeds down the ancestral line to the root node, all of the functions in the call stack are encountered in the proper order. Subsequently, as non-unique call stacks are encountered, a counter associated with the appropriate call stack node is incremented. After all of the call stacks for the period are counted, an appropriate user interface is presented to the user giving the user an idea as to how much time was spent in which portions of the program for that given time period.

Advanced profiling applications allow the user to change the time period under evaluation, causing the call stacks that were sampled to the new period to be counted again, thereby adjusting the presentation to the user.

BRIEF SUMMARY

At least one embodiment described herein relates the construction or use of a hierarchical time tree that represents an execution time of a program. To construct the hierarchical time tree, the time frame corresponding to the root node is the execution time during which the call stack samples were gathered from the program. Beginning at the root node, and proceeding recursively, each node is then populated in a manner that all of the call stacks for a given time period need not be accessed in order to provide a report regarding the given time period.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the construction or use of a hierarchical time tree that represents an execution time of a program is described. To construct the hierarchical time tree, the time frame corresponding to the root node is the execution time during which the plurality of call stack samples were gathered from the program. Beginning at the root node, and proceeding recursively, each node is then populated in a manner that all of the call stacks for a given time period need not be accessed in order to provide a report regarding the given time period. First, some introductory discussion regarding computing systems will be described with respect to FIG. 1. Then, the embodiments of the construction and use of the hierarchical time tree will be described with respect to FIGS. 2 through 6.

Figure 1:
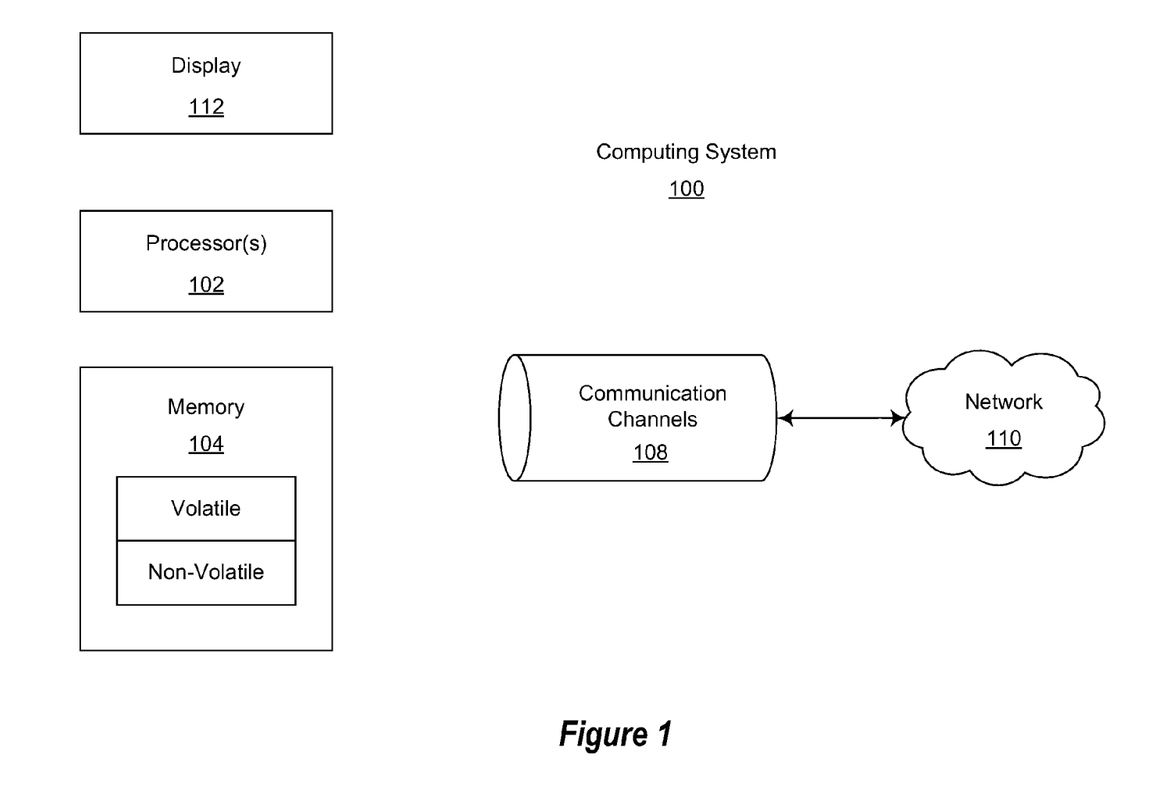
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. The computing system 100 also may include a display 112 that may be used to provide various concrete user interfaces, such as those described herein. Computing system 100 may also contain communication channels 108 that allow the computing system 100 to communicate with other message processors over, for example, network 110.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The components of a program interact by placing functional calls to each other during course of execution of the program. In order to manage the proper operation of a program, the operating system maintains a call stack that track which sequence of function calls has led to the current component being executed. When a functional call is placed, a level is pushed on the stack thereby conceptually leaving a breadcrumb so that the program knows where to return when the function is completed its work under the program. As the program executes, the call stack will change to reflect where the current state of the program execution is. In complex programs, call stacks may be literally hundreds of levels deep.

Conventional profiling techniques sample the call stack on a periodic basis generating a large collection of call stacks. A call stack tree generation process then traverses through all of the call stack samples to generate a call stack tree. The call stack tree begins with a root node that represents the main program. When a call stack reflects that the main program calls a function. A new node is added to the call stack tree to reflect the function call. When all the call stack samples have been evaluated, the result is a complex call stack tree that represents all call stacks, where each call stack types may be reconstructed by traversing from any given node up the ancestral chain to the root node. Each node in the call stack tree thus corresponds to a unique call stack type, the call stack type at least being unique within the execution of the program. In order to assist with at least some embodiments described herein, each call stack type may be assigned a unique identifier to allow a much smaller unique identifier to be used instead of a fuller representation of each call stack type.

The principles described herein allows the collection of call stacks to be evaluated in an efficient way that scales well, thereby allowing a profile report to be generated quickly and with acceptable accuracy. In one embodiment, this is accomplished using a hierarchical time tree. The hierarchical time tree is new and unique, and is not to be confused with the call stack tree described above, and which is conventional.

Figure 2:
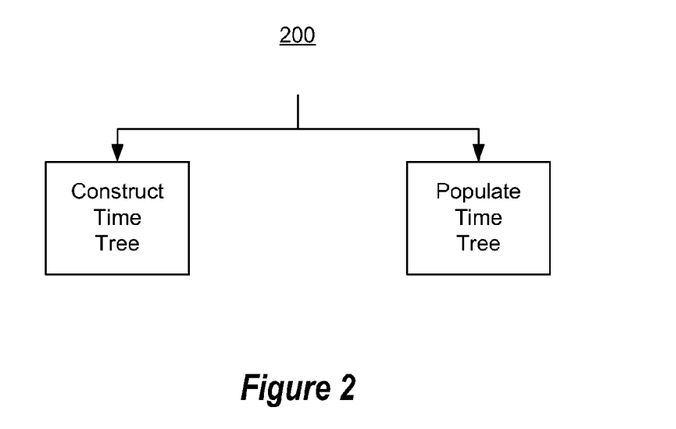
FIG. 2 illustrates a flowchart of a method for constructing a hierarchical time tree representing an execution time of a program.

FIG. 2 illustrates a flowchart of a method 200 for constructing a hierarchical time tree representing an execution time of a program. The hierarchical time tree will be used to efficiently evaluate and compile information gathered from the call stack samples. The hierarchical time tree includes a root node that represents an execution time of the program. In one embodiment, the root node represents the entire execution time of the program. The root node has zero or more child nodes. For any node in the hierarchical time tree, children nodes corresponding to a parent node each have time intervals that when put together, represent the same time interval as the parent.

For instance, suppose that the root node has a time interval beginning at time=0 milliseconds and ending at time=1000 milliseconds (i.e., expressed as [0,1000]). Now suppose the root node has four children nodes, Node A, Node B, Node C, and Node D. Node A might have a time interval from time=0 milliseconds to time=250 milliseconds (e.g., [0,250]). Node B might have a time interval from time=250 milliseconds to time=500 milliseconds, i.e., [250,500]. Node C might have a time interval from time=500 milliseconds to time=750 milliseconds [500,750]. Node D might have a time interval from time=750 milliseconds to time=1000 milliseconds [750,1000]. Likewise, Node A having interval [0,250] might have five children, having time intervals [0,50], [50,100], [100,150], [150,200] and [200,250].

The method 200 includes the construction (act 201) and population (act 202) of the hierarchical time tree. In one embodiment, not all of the call stack samples are included within the information that is populated in the hierarchical time tree. For instance, the call stack samples for some of the more rarely occurring call stacks might be ignored to allow the process to be more efficient. Ignoring some call stacks that more rarely occur might be acceptable when one recognizes that sampling itself does not assume the notion of perfect accuracy, since samples happen at random moments of a program execution. The whole reason of usage of sample reports is to find functions and/or call stacks responsible for the significant portion of the execution time, not to catch some minute effects.

In one embodiment, for each leaf node of the hierarchical time tree, at least some of the calls stacks sampled in the time frame corresponding to the leaf node may be included as part of the leaf node. In one example, the leaf node may include the call stack sample in their entirety. In another, perhaps just a unique identifier associated with the call stall is identified with the leaf node.

In one embodiment, for each non-leaf node of the hierarchical time tree, the non-leaf node represents at least some of the unique call stacks sampled in a time frame corresponding to the non-leaf node, as well as a count for a number of times each unique call stack was encountered in the time frame corresponding to the non-leaf node. The unique call stacks may be identified using the unique call stack identifier.

In the example that follows, the hierarchical time tree is populated as it is constructed. Thus, the act 201 and the act 202 of FIG. 2 are performed substantially simultaneously, or at least in an interleaved manner. For instance, the following process may be followed in order to construct and populate the hierarchical time tree.

Figure 3:
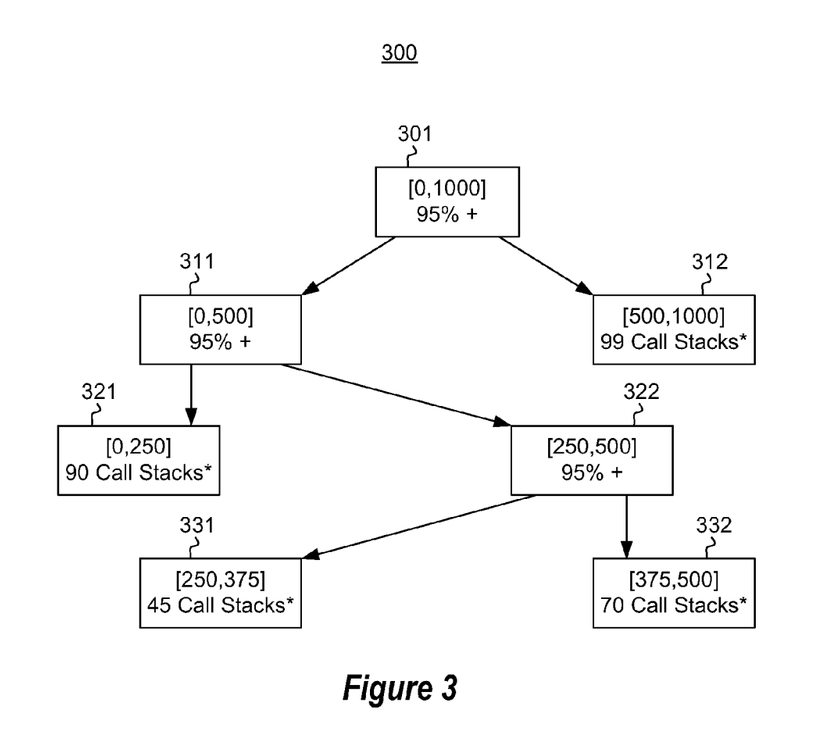
FIG. 3 shows an example hierarchical time tree that may be constructed using the method of FIG. 2.
Figure 4:
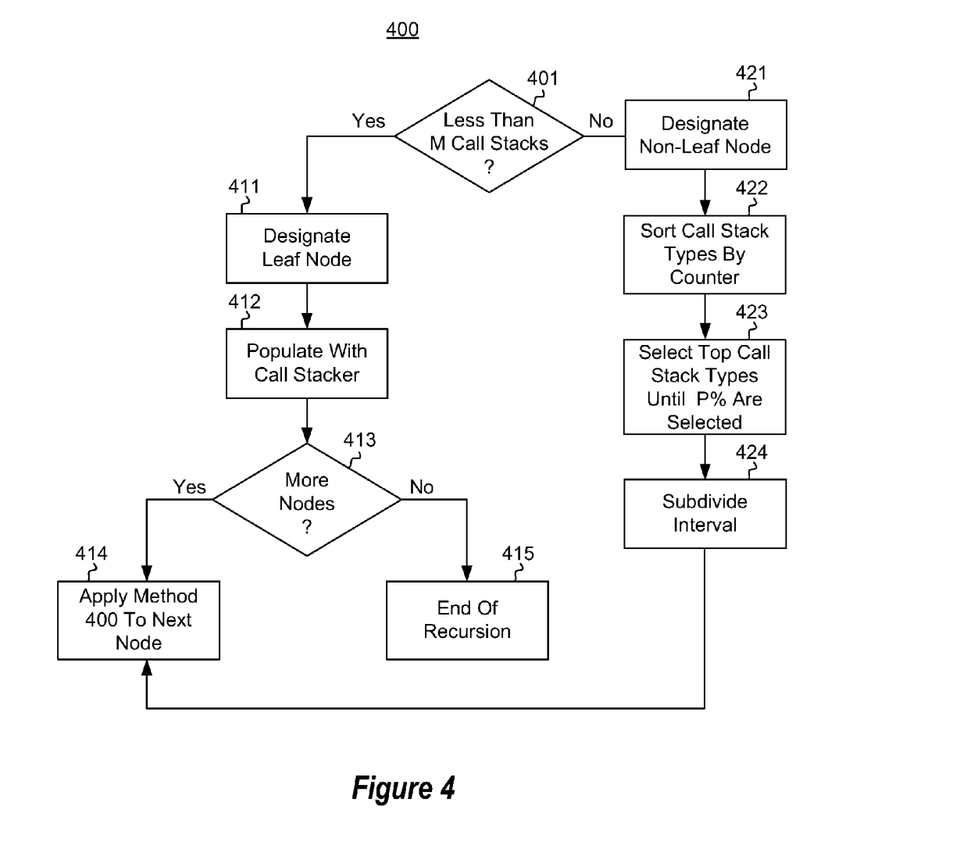
FIG. 4 illustrates a flowchart of a more specific method for constructing a hierarchical time tree representing an execution time of a program, and is an example of the method of FIG. 2.

First, the root node is assigned a corresponding interval of the execution time interval of the program. In one embodiment, the root node represents an entire execution time period of the program. FIG. 3 represents an example hierarchical time tree 300. In this example, the root node 301 corresponds to time interval [0,1000] (i.e., 0 to 1000 milliseconds). Then, the method 400 of FIG. 4 is applied to each node of the hierarchical time tree recursively. At this point, only the root node of the hierarchical tree exists. However, the method 400 will cause other child nodes to be added.

If the current interval of the node being subjected to the method contains less than M call stack samples (where M is some integer than may be configured) (Yes in decision block 401), a current node is designated a leaf node (act 411), and the current node is populated with all call stack samples (act 412), and the method 400 is recursively performed for the next node in the hierarchical time tree (act 414) if there are further nodes to be populated in the hierarchical time tree (Yes in decision block 413), or the recursion ends (act 415) if there are no further nodes to be populated in the hierarchical tree (No in decision block 413).

Applying this method 400 to the root node of the time tree 300, suppose that "M" is 100. Now suppose that there are more than 100 call stack samples in the interval [0,1000]. In that case (No in decision block 401), a different processing path through method 400 is undertaken and the node is designated as a non-leaf node (act 421). The call stack types corresponding to that current interval are sorted by their counters (act 422), with the most frequently occurring call stack types appearing at the top of the list. Then, the more frequently occurring call sample types are selected from top down until a certain percentage P of the total number of call stacks for that interval are selected (act 423). Then, the interval is subdivided into N subintervals (where N is an integer) and a new child node is created for each subdivided interval (act 424). The method 400 then recursively performs the method 400 for the next node (act 414).

Applying this to the root node 301 of FIG. 3, the root node is designated as a non-leaf node (act 421), and the call stack types corresponding to that interval are then sorted by their counter (act 422). Suppose, for example, that there are 330 call stack samples in the interval [0,1000] and that when sorted by counter, they include the following list:

| Call Stack Type: | Counter |
|---|---|
| A | 113 |
| B | 75 |
| C | 46 |
| D | 25 |
| E | 24 |
| F | 19 |
| G | 13 |
| H | 9 |
| I | 6 |

There are thus 9 different types of call stacks A through I, with 330 total call stack samples. The call stack sample types are selected from the top of the list until at least 95% (where in this case P=95%) of the call stack samples are accounted for (act 423) by including the statistics for only those top call stack types in the non-leaf node. For instance, this might include using a pair of the unique identifier for the call stack type in combination with its counter for that interval. The 95% threshold occurs when call stack types A through G are selected. Rarely occurring call stack types H and I are discarded from the report. The interval [0,1000] is then divided into two (wherein in this case N=2) subintervals, and a new child node is created and correlated to each subinterval (act 424). In this case, the sub-intervals are [0,500] and [500, 1000] although there is no requirement for equal subdivision of intervals. Node 311 is correlated to interval [0,500] and Node 312 is correlated to interval [500,1000]. The method 400 then moves to the next node (i.e., node 311 in the example).

Applying the method 400 to the node 311 of FIG. 3, the number of call stacks within the interval [0,500] is 216, which is at least 100 (No in decision block 401). The node 311 is thus designated as a non-leaf node (act 421), and the call stack types corresponding to that interval are then sorted by their counter (act 422). As an example, suppose after sorting by counter, the following list is generated:

| Call Stack Type: | Counter |
|---|---|
| A | 72 |
| B | 44 |
| C | 35 |
| E | 21 |
| D | 20 |
| F | 14 |
| G | 10 |

There are thus 7 different types of call stacks A through G, with 216 total call stack samples. The call stack sample types are selected from the top of the list until at least 95% of the call stack samples are accounted for (act 423) by including the statistics for only those call stack types in the non-leaf node. For instance, this might include using a pair of the unique identifier for the call stack type in combination with its counter for that interval. The 95% threshold occurs when call stack types A through F are selected. Rarely occurring call stack type G is discarded from the report. The interval [0,500] is then divided into two subintervals, and a new child node is created and correlated to each subinterval (act 424). In this case, the sub-intervals are [0,250] and [250,500]. Node 321 is correlated to interval [0,250] and Node 322 is correlated to interval [250,500]. The method 400 then moves to the next node (i.e., node 321 in the example, although it could be node 312 depending on the method of recursion).

Applying the method 400 to the node 321 of FIG. 3, the number of call stacks within the interval [0,250] is 90, which below the 100 threshold (Yes in decision block 401). The node 321 is thus designated as a leaf node (act 411), and populated with all of the call stacks corresponding to the interval [0,250] (act 412). The asterisks are used in FIG. 3 to show those nodes that are designated as leaf nodes. There are further nodes to evaluate (Yes in decision block 413), and thus the method 400 is applied to the next node (act 414). In this recursion type, the next node is node 322.

Applying the method 400 to the node 322 of FIG. 3, the number of call stacks within the interval [250,500] is 116, which is at least 100 (No in decision block 401). The node 322 is thus designated as a non-leaf node (act 421), and the call stack types corresponding to that interval are then sorted by their counter (act 422). As an example, suppose after sorting by counter, the following list is generated:

| Call Stack Type: | Counter |
|---|---|
| A | 40 |
| B | 26 |
| C | 25 |
| E | 15 |
| D | 9 |
| F | 1 |

There are thus 6 different types of call stacks A through F, with 116 total call stack samples. The call stack sample types are selected from the top of the list until at least 95% of the call stack samples are accounted for (act 423) by including the statistics for only those call stack types in the non-leaf node. For instance, this might include using a pair of the unique identifier for the call stack type in combination with its counter for that interval. The 95% threshold occurs when call stack types A through E are selected. Rarely occurring call stack type F is discarded from the report. The interval [250, 500] is then divided into two subintervals, and a new child node is created and correlated to each subinterval (act 424). In this case, the sub-intervals are [250,375] and [375,500]. Node 331 is correlated to interval [250,375] and Node 332 is correlated to interval [375,500]. The method 400 then moves to the next node (i.e., node 331 in the recursion example)

Applying the method 400 to the node 331 of FIG. 3, the number of call stacks within the interval [250,375] is 45, which below the 100 threshold (Yes in decision block 401). The node 331 is thus designated as a leaf node (act 411), and populated with all of the call stacks corresponding to the interval [250,375] (act 412). There are further nodes to evaluate (Yes in decision block 413), and thus the method 400 is applied to the next node (act 414). In this recursion type, the next node is node 332.

Applying the method 400 to the node 332 of FIG. 3, the number of call stacks within the interval [375,500] is 70, which below the 100 threshold (Yes in decision block 401). The node 332 is thus designated as a leaf node (act 411), and populated with all of the call stacks corresponding to the interval [375,500] (act 412). There are further nodes to evaluate (Yes in decision block 413), and thus the method 400 is applied to the next node (act 414). In this recursion type, the next node is node 312.

Applying the method 400 to the node 312 of FIG. 3, the number of call stacks within the interval [500,1000] is 99, which below the 100 threshold (Yes in decision block 401). The node 312 is thus designated as a leaf node (act 411), and populated with all of the call stacks corresponding to the interval [500,1000] (act 412). There are further no nodes to evaluate (No in decision block 413), and thus the time tree is now fully generated and populated (act 415).

Figure 5:
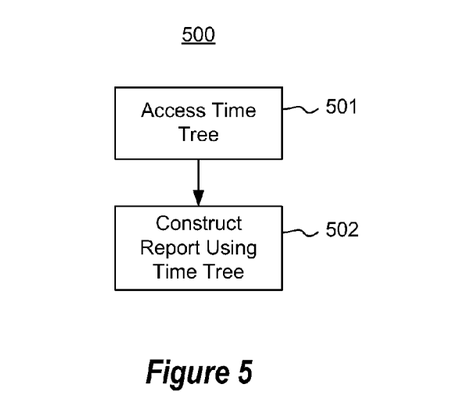
FIG. 5 illustrates a flowchart of a method for using a time tree structure in order to construct a report regarding the call stack samples acquired over a given time interval of execution.

FIG. 5 illustrates a flowchart of a method for using a time tree structure in order to construct a report regarding the call stack samples acquired over a given time interval of execution. First, the hierarchical time tree is accessed (act 501), and then the time tree is used to construct a report regarding the gathered call stack samples without having to separately access all of the call stack samples.

Figure 6:
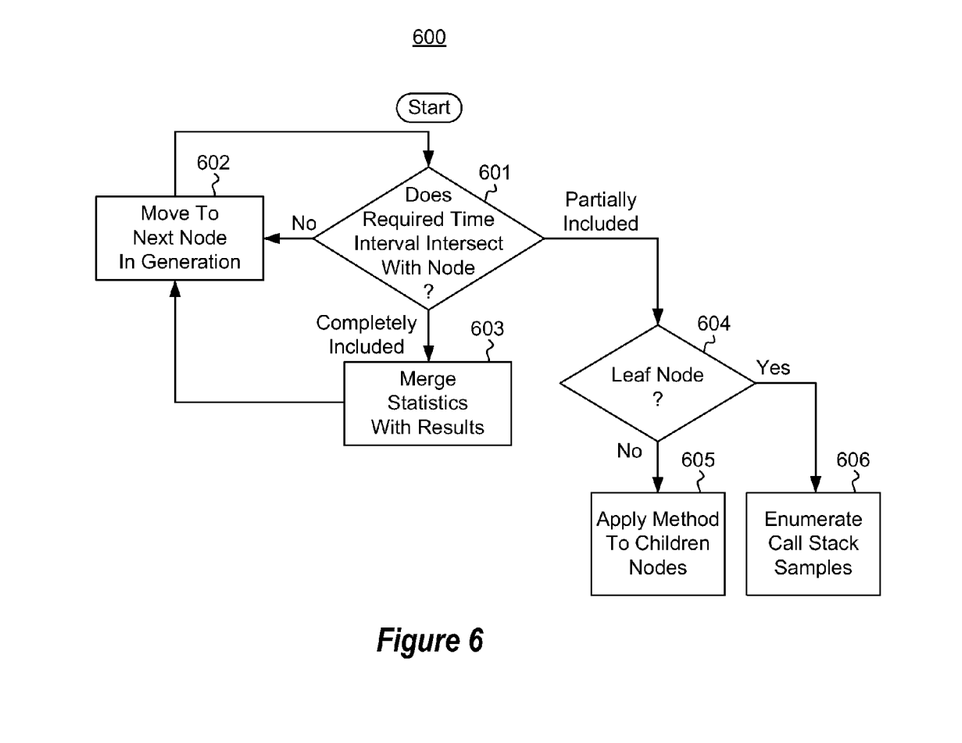
FIG. 6 illustrates a flowchart of a more specific method that represents an example of the method of FIG. 5.

FIG. 6 illustrates a flowchart of a method 600 for using the time tree to construct such a report. The method 600 is performed beginning at the root node. As an example, the method 600 will be applied to the example time tree 300 shown in FIG. 3. The processing differs (see decision block 601) depending on whether the given time interval 1) does not intersect at all with that of the node under evaluation (No in decision block 601), 2) completely intersects with that of the node ("Completely Included" in decision block 601), or 3) only partially intersects with that of the node ("Partially Included" in decision block 601). Several examples will now be provided to illustrate all processing paths of the method 600.

First, suppose that the user wants to view a report for the interval [700,1000]. The method 600 is first evaluated against the root node 301. The interval [700,1000] only partially intersects with the time interval [0,1000] (Partially Included in decision block 601). The root node 301 is not a leaf node (No in decision block 604), and thus the child nodes of the root node (i.e., the first generation children nodes) are then evaluated.

The method 600 is then evaluated against the node 311. The interval [700,1000] does not intersect at all with the time interval [0,500] (No in decision block 601). Processing thus proceeds to the next node 312 in the first generation children nodes.

The method 600 is then evaluated against the node 312. The interval [700,1000] only partially intersects the interval [500,1000] of node 312 (Partially Included in decision block 601). Furthermore, node 312 is a leaf node (Yes in decision block 604). Thus, the method enumerating the call stack samples of the leaf node that are within the specified time interval [700,1000], thereby completing the method. It was not necessary to evaluate the second generation children nodes 321 because the act 605 was not encountered in evaluating the first generation child node 311. Act 605 was only encountered when evaluating the root node. Note that the only enumerations in which the call stacks were accessed was for node 312, which included only 99 call stacks.

Now suppose the use wants to obtain a report for the interval [0,700]. The method is first evaluated against the root node 301. Once again, the interval [700,1000] only partially intersects with the time interval [0,1000] (Partially Included in decision block 601). The root node is not a leaf node (No in decision block 604), and thus the child nodes of the root node (i.e., the first generation children nodes) are then evaluated.

The method 600 is then evaluated against the node 311. The interval [0,700] completely intersects time interval [0,500] (Completely Included in decision block 601). The statistics for this node are then merged into the results (act 603). For instance, recall that in the example, the statistics for node 311 include the following:

| Call Stack Type: | Counter |
|---|---|
| A | 72 |
| B | 44 |
| C | 35 |
| E | 21 |
| D | 20 |
| F | 14 |

These numbers for each of the call stacks are then tallied against any counters for these same call stack types that had been previously enumerated. In this case, the previous tallies were zero for each, and thus future counting begins at these numbers. The process then moves to the next node in the generation. In this case, the next node would be node 312.

The method 600 is then evaluated against the node 312. The interval [0,700] only partially intersects the interval [500,1000] of node 312 (Partially Included in decision block 601). Furthermore, node 312 is a leaf node (Yes in decision block 604). Thus, the method enumerating the call stack samples of the leaf node that are within the specified time interval [500,700], thereby completing the method. Again, it was not necessary to evaluate the second generation children nodes 321 because the act 605 was not encountered in evaluating the first generation child node 311. Note that the only enumerations in which the call stacks were accessed was for node 312, which included only 99 call stacks.

One final example is now provided for the interval [300,700]. The method is first evaluated against the root node 301. Once again, the interval [300,700] only partially intersects with the time interval [0,1000] (Partially Included in decision block 601). The root node is not a leaf node (No in decision block 604), and thus the child nodes of the root node (i.e., the first generation children nodes) are then evaluated. In this example, some recursion will be encountered.

The method is then evaluated against the node 311. The interval [300,700] only partially intersects with the time interval [0,500] (Partially Included in decision block 601). The node 311 is not a leaf node (No in decision block 604), and thus the child nodes of the node 311 (i.e., the second generation children nodes 321 and 322) are then evaluated. Through recursion, the node 312 will eventually be evaluated, but in this type of recursion example, the second generation node 321 is the next node to be evaluated.

The method 600 is then evaluated against the node 321. The interval [300,700] does not intersect at all with the time interval [0,250] (No in decision block 601). Processing thus proceeds to the next node 322 in the second generation children nodes (act 602).

The method 600 is then evaluated against the node 322. The interval [300,700] only partially intersects with the time interval [250,500] (Partially Included in decision block 601). The node 322 is not a leaf node (No in decision block 604), and thus the child nodes of the node 322 (i.e., the third generation children nodes 331 and 332) are then evaluated.

The method 600 is then evaluated against the node 331. The interval [300,700] only partially intersects the interval [250,375] of node 331 (Partially Included in decision block 601). Furthermore, node 331 is a leaf node (Yes in decision block 604). Thus, the method enumerating the call stack samples of the leaf node that are within the specified time interval [300,375]. Process then proceeds to the next third generation node 332.

The method 600 is then evaluated against the node 332. The interval [300,700] fully intersects the interval [375,500] of node 312 (Completely Included in decision block 601). The statistics for the node 332 are then merged with the results. In one example, this may be performed by performing a count of each call stack type of the 70 call stacks in the node 332. Alternatively, the statistics (i.e., the count for each type of call stack) may have been pre-calculated for the node 332, in which case those statistics may be used in the results without having to access each individual call stack corresponding to the time interval [375,500] This completes processing for the third generation child nodes 331 and 332, and for the second generation child nodes 321 and 322. Through recursion, processing then proceeds to the node 312 for evaluation.

The method 600 is then evaluated against the node 312. The interval [300,700] only partially intersects the interval [500,1000] of node 312 (Partially Included in decision block 601). Furthermore, node 312 is a leaf node (Yes in decision block 604). Thus, the method enumerating the call stack samples of the leaf node that are within the specified time interval [500,700]. Processing thus completes.

This method has a number of efficiency benefits. Most significantly, the amount of data that needs to be read from the call stack sample file is significantly lower than it would be if we were reading all stacks one by one. In some cases, the statistics for nodes having a time interval that is fully contained within the time interval of interested, statistics may be quickly merged. Second, the amount of merged trees and seeks is limited by their logarithmical number. Third, the amount of merged individual stacks is limited by their limited number in a node (M).

Accordingly, the principles described herein permit for a scalable and dynamic generation of reports based on sampled call stacks gathered during an execution of a program. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer-storage device having stored thereon computer-executable instructions that, when executed by one or more processors of the computing system, cause a computing system to perform the following:
    an act of constructing a hierarchical time tree representing an execution time of a program that was executed to obtain a plurality of call stack samples, wherein the hierarchical time tree includes a plurality of nodes, each node corresponding to an execution time interval, each node including an indication of the number of call stack samples obtained during that execution time interval; and
    an act of populating each node of the hierarchical time tree with information from the call stack samples corresponding to that node's time interval.

2. The computer program product in accordance with claim 1, wherein at least some of the plurality of call samples are not included within the information that is populated in the hierarchical time tree.

3. The computer program product in accordance with claim 1, wherein the act of populating comprises:
    for each leaf node of the hierarchical time tree, representing at least some of the call stacks sampled in a time frame corresponding to the leaf node.

4. The computer program product in accordance with claim 3, wherein for at least some of the leaf nodes, each of the call stacks in that leaf node are represented as raw call stack data.

5. The computer program product in accordance with claim 3, wherein the act of populating further comprises:
    for each non-leaf node of the hierarchical time tree, representing at least some of the unique call stacks sampled in a time frame corresponding to the non-leaf node, as well as a count for a number of times each unique call stack was encountered in the time frame corresponding to the non-leaf node.

6. The computer program product in accordance with claim 5, wherein for at least some of the non-leaf nodes, each of the call stacks in that leaf node are presented using a call stack identifier.

7. The computer program product in accordance with claim 1, wherein for each of at least some of the non-leaf nodes, the at least some of the unique call stacks represents at least a predetermined percentage of all of the call stacks in the time interval corresponding to the non-leaf node.

8. The computer program product in accordance with claim 7, wherein the predetermine percentage is configurable.

9. The computer program product in accordance with claim 7, wherein the predetermined percentage is at least 80 percent or greater, but is less than 100 percent.

10. The computer program product in accordance with claim 7, wherein the predetermined percentage is at least 90 percent or greater, but is less than 100 percent.

11. The computer program product in accordance with claim 7, wherein the acts of constructing a hierarchical time tree and the act of populating the hierarchical time tree are performed substantially at the same time.

12. The computer program product in accordance with claim 7, wherein the acts of constructing a hierarchical time tree and the act of populating the hierarchical time tree are performed by performing the following:
    an act of setting the time frame corresponding to the root node in the hierarchical time tree to be the entire execution time during which the plurality of call stack samples were gathered.

13. The computer program product in accordance with claim 12, wherein the computer-executable instructions further cause the computing system to perform the following:
    an act of performing the following beginning at a root node of the hierarchical time tree and continuing through each node of the hierarchical time tree:
        if a time interval of the current node contains less than a certain number of call stack samples, then the current node is a leaf node, and the leaf node is populated with call stack samples sampled in the time interval;
        if a time interval of the current node contains at least the certain number of samples, then the current node is a non-leaf node, and the non-leaf node is populated with compiled call stack frequency data regarding at least some of the of call stacks in the time interval corresponding to the current node, the time interval is subdivided into a number of sub-periods, and the same number of child nodes are created, each corresponding to one of the sub-periods.

14. A computer program product comprising a computer-storage device having stored thereon computer-executable instructions that, when executed by one or more processors of the computing system, cause a computing system to perform the following:
    an act of accessing a hierarchical time tree representing an execution time of a program that was executed to obtain a plurality of call stack samples, wherein the hierarchical time tree includes a plurality of populated nodes, each populated node corresponding to an execution time frame, each populated node including an indication of the number of call stack samples obtained during that execution time frame, and in response to a detection of a specified time interval within the execution time of the program; and
    an act of using the hierarchical time tree to construct a report regarding the plurality of call stack samples without having to separately access all of the plurality of call stack samples.

15. The computer program product in accordance with claim 14, wherein the act of using the hierarchical time tree to construct the report comprising:
    for at least a first generation of child nodes in the hierarchical time tree, for any child node that has a time interval that does not intersect with the specified time interval, an act of ignoring that child node; and,
    for any child node that has a time interval that is fully contained within the specified time interval, an act of merging all of raw stack sample data from that child node.

16. The computer program product in accordance with claim 15, wherein the act of using the hierarchical time tree to construct the report further comprises the following for each of at least a first generation of child nodes in the hierarchical time tree:
    for any child node that is a leaf node in the hierarchical time tree and that has a time interval that is only partially contained within the specified time interface, an act of enumerating the call stack samples of the leaf node that are within the specified time interval.

17. The computer program product in accordance with claim 16, wherein the act of using the hierarchical time tree to construct the report further comprises the following for each of at least a first generation of child nodes in the hierarchical time tree:

for any child node that is a non-leaf node in the hierarchical time tree and that has a time interval that is only partially contained within the specified time interface, an act of enumerating next generation child nodes and applying the same method to each of the next generation child nodes of the non-leaf node.

18. The computer program product in accordance with claim 15, wherein the act of using the hierarchical time tree to construct the report further comprises the following for each of at least a first generation of child nodes in the hierarchical time tree:

for any child node that is a non-leaf node in the hierarchical time tree and that has a time interval that is only partially contained within the specified time interface, an act of enumerating next generation child nodes and applying the same method to each of the next generation child nodes of the non-leaf node.

19. At a computer system including at least one processor and a memory, a computer-implemented method for constructing and populating a hierarchical time tree representing an execution time of a program that was executed to obtain a plurality of call stack samples, wherein the hierarchical time tree includes a plurality of nodes, each node corresponding to an execution time interval:

an act of setting the time frame corresponding to the root node in the hierarchical time tree to be the entire execution time during which the plurality of call stack samples were gathered; and an act of the processor performing the following beginning at a root node of the hierarchical time tree and continuing through each node of the hierarchical time tree:

if a time interval of the current node contains less than a certain number of call stack samples, then the current node is a leaf node, and the leaf node is populated with call stack samples sampled in the time interval; and if a time interval of the current node contains at least the certain number of samples, then the current node is a non-leaf node, and the non-leaf node is populated with compiled call stack frequency data regarding at least some of the of call stacks, the compiled call stack frequency data being obtained during the time interval corresponding to the current node, the time interval being subdivided into a number of sub-periods, and the same number of child nodes are created, each corresponding to one of the sub-periods.

20. The method in accordance with claim 19, further comprising:

an act of accessing the hierarchical tree; and an act of using the hierarchical time tree to construct a report regarding the plurality of call stack samples without having to separately access all of the plurality of call stack samples.

* * * * *